United States Patent [19]

Olsen

[11] Patent Number: 5,051,980
[45] Date of Patent: Sep. 24, 1991

[54] DATA COMMUNICATION INTERFACE DEVICE

[75] Inventor: Stewart L. Olsen, El Paso, Tex.

[73] Assignee: El Paso Natural Gas Company, El Paso, Tex.

[21] Appl. No.: 551,640

[22] Filed: Jul. 12, 1990

Related U.S. Application Data

[63] Continuation of Ser. No. 231,373, Aug. 11, 1988, abandoned.

[51] Int. Cl.⁵ .............................................. H04J 3/00
[52] U.S. Cl. .................................. 370/32.1; 379/401; 379/406; 379/344; 379/347; 375/36
[58] Field of Search ............... 379/338, 340, 344, 347, 379/399, 400, 401, 406, 407; 375/3, 4, 7, 14, 36, 96, 121; 370/32, 32.1, 85; 333/24 R, 27, 81 A, 99 R

[56] References Cited

U.S. PATENT DOCUMENTS

| | | |
|---|---|---|
| 3,646,465 | 2/1972 | Hartlaub . |
| 3,939,435 | 2/1976 | Suzuki ................................. 330/51 |
| 4,024,501 | 5/1977 | Herring et al. ..................... 375/7 |
| 4,443,884 | 4/1984 | Swarz . |
| 4,595,803 | 6/1986 | Wright ................................ 370/32 |
| 4,607,170 | 8/1986 | Wickman . |
| 4,621,367 | 11/1986 | Horiguchi et al. ................ 375/36 |
| 4,683,441 | 7/1987 | Naylor . |

FOREIGN PATENT DOCUMENTS 0181251 11/1982 Japan ................................. 375/36

OTHER PUBLICATIONS

Linear Applications, vol. 1, Radio Shack, National, May 1968, AN5-1-AN5-10.

Primary Examiner—Jin F. Ng
Assistant Examiner—Jhancy Augustus
Attorney, Agent, or Firm—Bacon & Thomas

[57] ABSTRACT

A Data Communication Device permits extended range RS-232 communications between two devices by utilizing a current loop between the remote device and the Data Communication Device. The Data Communication Device may be used for any mix of signal or control lines specified for RS-232 and will support multiple remote devices in a broadcast mode or half duplex polled mode. Only a single Data Communication Device per remote communications circuit is required.

15 Claims, 7 Drawing Sheets 5,051,980

DATA COMMUNICATION INTERFACE DEVICE

This application is a continuation of application Ser. No. 231,373, filed Aug. 11, 1988, now abandoned.

BACKGROUND OF THE INVENTION

1. Field of the Invention

The present invention relates to the field of data communication interfacing, specifically extending the range for communication between computer(s) and remotely located peripherals such as, sensors and receivers.

2. Prior Art

In typical computer-controlled systems, the computer or processor system communicates with remotely located peripheral devices or sensors through industry standardized communications lines. Among those industry standards is the RS-232C standard developed by the Electronic Industry Association (EIA). The various industry standard interfaces available allow the computer or processor devices to communicate with various types and with a plurality of remotely located peripheral devices or sensors.

The practical limitations of the various industry standard interfaces include the number of remotely located peripheral devices that can be communicated with by a single computer or processor device, the distance between the computer and the remotely located peripheral device due to signal attenuation and/or noise, and driving power consumption requirements of the receiving remotely located peripheral device. Accordingly, application of computer/computer-controlled technology can be hampered by such practical limitations. When the requirements of a system or operation exceed the capabilities of a single computer or processor, more units are needed to accomplish those requirements.

When a computer or processor can only communicate with peripheral devices located short distances away, additional computers or processors are required for communicating with those devices that are located long, remote distances away. When a computer or processor device can only communicate with remotely located peripheral devices at a slower speed, the system or operation requires more time to perform a given task. When the transmitting computer or processor must provide driving power to the remotely located peripheral device or when more power must be provided for the peripheral device at its remote location, the system or operation desired becomes more complex and potentially costly.

By overcoming some if not all of these practical limitations, wider application of computer or computer-controlled technology can result in greater efficiency and capacity in a system or operation and can produce substantial cost savings. Fewer computers or processors can be used to control and/or monitor a larger number of remotely located peripheral devices located further away than is possible with the prior art systems. Higher speeds of transmission of data between the computer and the peripheral devices can result in higher efficiencies. No driving power requirements at the remote locations of the remotely located peripheral devices can reduce overall power consumption.

In systems that use RS-232C standard, transmission is typically limited to fifteen meters (approximately 50 feet) at 19,200 baud (similar to bits per second). In some applications, the RS-232C interface standard has been used at a distance of 500 meters (approximately 1600 feet) with a signaling rate of 600 baud.

Usage of RS-232C interface standard is not a problem in a number of applications where typical RS-232C interface connections between computers and peripheral devices have not exceeded the discussed practical limitations. However, there are a number of applications where the desired RS-232C interfacing is not possible with the prior art systems because of the distance and other limitations of the prior art systems.

As an example, in the field of natural gas processing, use of a minimum number of computers or processors to monitor a plurality of remotely located peripheral devices and/or sensors would be desirable. Such application may require the RS-232C interfacing to exceed distances of 1,524 meters (5,000 feet) between a computer monitoring station and a remotely located processing operation or sensor. Use of RS-232C interfacing with its present practical limitations can result in a costly and inefficient system due to the large number of computer stations needed, the relatively lower number of functions performed by each computer, and the corresponding hardware and power requirements of such a system.

SUMMARY OF THE INVENTION

The present invention relates to a data communication interface device for extended range communication comprising output signal voltage swing controlling circuitry, input signal amplifying circuitry, and a plurality of remote channel ports utilizing operational amplifiers (op-amps) to drive at least one control signal and/or at least one data signal between a computer or processor and at least one remotely located peripheral device. The present invention extends the communication range capability of systems using RS-232 interfacing.

One aspect of the present invention is to provide a data communications interface device that overcomes the distance limitation encountered by conventional RS-232 interfacing and is capable of exceeding distances of 1,524 meters (5,000 feet).

Another aspect of the invention is to combine several RS-232 ports onto a single port for multiple remote polling.

A further aspect of the present invention is to drive the data and control signals both outgoing to the remotely located peripheral device and incoming to the computer or processor thereby overcoming the problem of the needed driving power for the remotely located devices.

The foregoing objects and advantages of the present invention will become more apparent upon reference to the following specifications, drawings and claims.

DESCRIPTION OF THE INVENTION

Figure 1:
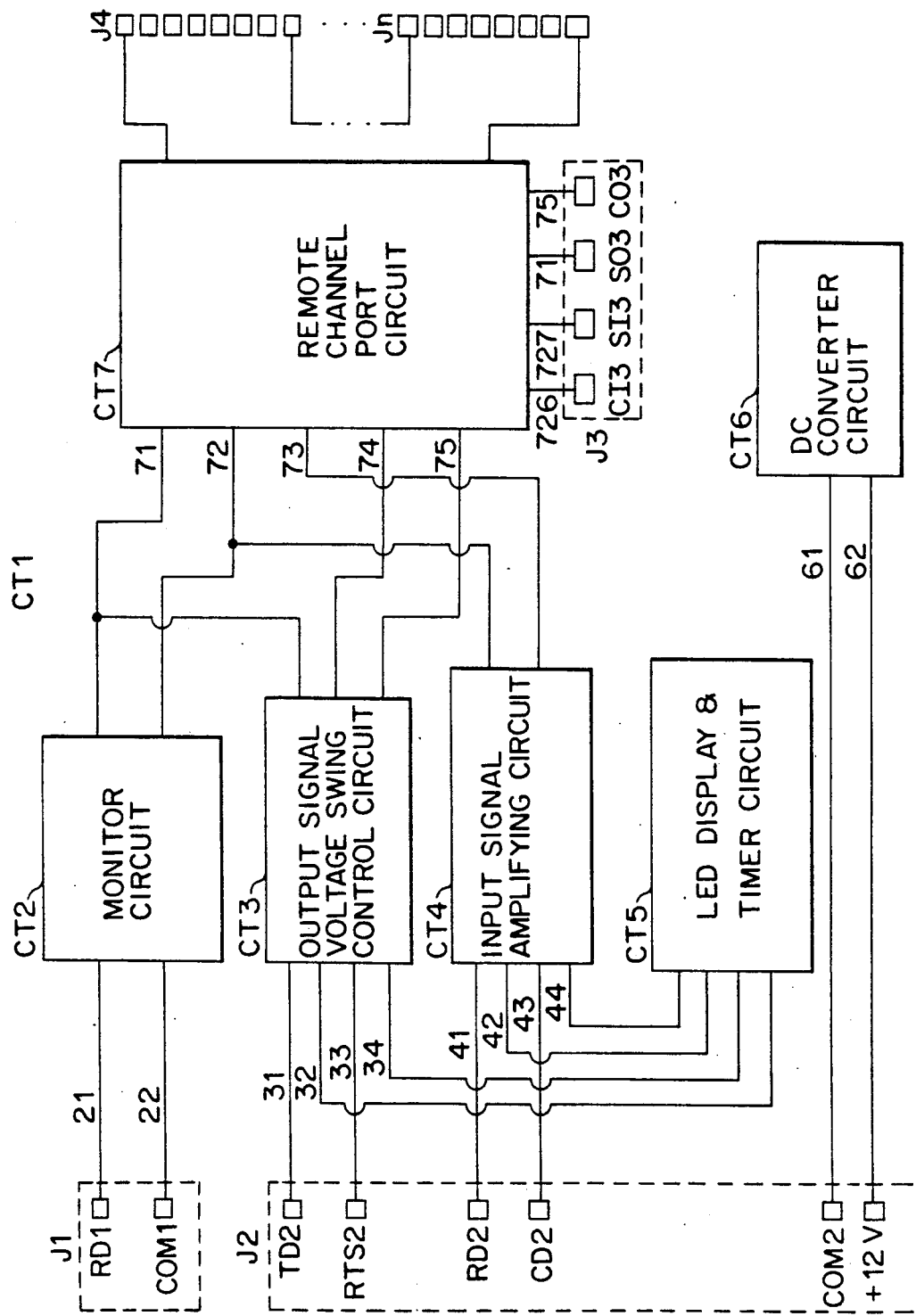
FIG. 1 is a system block diagram of a preferred embodiment of the data communication interface circuit of the present invention.

The invention relates to a data communication interface device for extended range communication between a first external source and receiver such as a computer or processor, and at least one second external signal source and receiver such as a computer's peripheral device or sensor. The invention generally comprises means for controlling the voltage swing of at least one output signal, means for amplifying at least one input signal, and at least one remote channel port providing means for connecting to the second external signal source and receiver.

The output voltage swing control means controls the first external signal source output signal(s) coming from the first external signal source and going to the remote channel port means. It comprises at least one operational amplifier (op-amp), preferably configured in comparator mode, and at least one slew rate control circuit preferably comprising a resistor-capacitor (RC) circuit. The output signal from the first external signal source is first transmitted to the comparator mode op-amp; the op-amp then outputs a first voltage swing controlled output signal to the slew rate control circuit. The slew rate control circuit converts the first voltage swing controlled output signal into a second voltage swing controlled output signal and transmits that signal to the remote channel port means.

The input signal amplifying means amplifies the first remote channel input signal(s) coming from the remote channel port means and going to the first external signal receiver. It comprises at least one op-amp, preferably configured in noninverting amplifier mode. The input signal from the remote channel port means is received by the op-amp which converts the first remote channel signal into a first amplified signal to the first external signal receiver.

The remote channel port means controls the transfer of signals between the input signal amplifying means and the second external signal source, and between the output voltage swing control means and the second external signal receiver. It comprises at least one op-amp preferably configured in differential amplifier mode, and/or at least one op-amp preferably configured in noninverting amplifier mode. The differential mode op-amp receives first and second external input signals from the second external signal source. The differential mode op-amp accordingly converts the first and second external input signals into the first remote channel input signal to the input signal amplifying means. The noninverting mode op-amp receives the second voltage swing controlled output signal from the slew rate control circuit and converts it into a third voltage swing controlled output signal to the second external signal receiver.

Optionally, the data communication interface device includes signal echo suppression means that suppresses signal echo for the first remote channel input signal to the input signal amplifying means, and for the first or second voltage swing controlled output signal to the remote channel port means. The signal echo suppression means generally comprises an analog switch circuit having at least one analog switch that connects the first remote channel input signal to the input signal amplifying means whereby the analog switch circuit converts the first remote channel input signal into a first echo suppressed input signal. The first or second voltage swing controlled output signal is connected to the disable input control contacts of the analog switch circuit.

DETAILED DESCRIPTION OF THE INVENTION

With respect to defining the terms used in the following detailed description, the term "node" refers to a terminal of any branch of a network or a terminal common to two or more branches of a network in an electrical/electronic circuit. *IEEE Standard Dictionary of Electrical and Electronics Terms.* New York, The Institute of Electrical and Electronics Engineers, Inc., Third Edition, 1984, p. 573. This refers but is not limited to wires, conductive traces on a circuit board, and conductive traces/etchings on or in an integrated circuit substrate.

The term "connector" is defined as a coupling device employed to connect conductors of one circuit or transmission element with those of another circuit or transmission element. *IEE Standard Dictionary of Electrical and Electronic Terms,* 1984. p.181.

The term "contact" is defined as conducting parts which co-act to complete or to interrupt a circuit. *IEEE Standard Dictionary of Electrical and Electronic Terms,* 1984. p. 185. In the following detailed description, the conducting parts referred to as contacts refer but are not limited to connector contacts, IC chip pins, and conductive pads.

Referring to FIG. 1, a system block diagram depicting a typical data communication interface device (CT1) according to the invention is shown. The data communication interface circuit (CT1) comprises a monitor circuit (CT2), an output signal voltage swing control circuit (CT3), an input signal amplifying circuit (CT4), a LED display and timer circuit (CT5), a DC converter circuit (CT6), at least one remote channel port circuit (CT7) and a plurality of input/output (I/O) connectors (J1 to Jn).

The monitor circuit CT2 connects to I/O connector J1 via nodes 21 and 22 where node 21 connects to I/O connector contact RD1 and node 22 connects to common ground COM1. Monitor circuit CT2 connects to the remote channel port circuit CT7 via nodes 71 and 72. The monitor circuit CT2 is also connected to output signal voltage swing control circuit CT3 via node 71 and to input signal amplifying circuit CT4 via node 72.

The output signal voltage swing control circuit CT3 is connected to I/O connector J2 via nodes 31 and 33 where node 31 is connected to I/O connector contact TD2 and node 33 is connected to I/O connector contact RTS2. Output signal voltage swing control circuit CT3 is connected to the remote channel port circuit CT7 via nodes 74 and 75. CT3 is connected to the LED display and timer circuit CT5 via nodes 32 and 34. I/O connector J2 generally connects to a first external signal source and receiver, such as a computer or processor.

The input signal amplifying circuit CT4 is connected via nodes 41 and 43 to I/O connector J2 where node 41 is connected to I/O connector contact RD2 and node 43 is connected to I/O connector contact CD2. CT4 is connected to the remote channel port circuit CT7 via node 73. CT4 is connected to the LED display and timer circuit CT5 via nodes 42 and 44.

The DC converter circuit CT6 is connected via nodes 61 and 62 to the I/O connector J2 where node 61 is connected to the common ground COM2 and node 62 is connected to the +12 volt supply.

The remote channel port circuit CT7 is connected to the expansion port J3 via nodes 71, 75, 76 and 77 where node 77 is connected to expansion port connector contact CI3, node 76 to expansion port connector contact SI3, node 71 to expansion port connector contact SO3 and node 75 to expansion port connector contact CO3. The remote channel port circuit CT7 is connected through the I/O connectors (J4 to Jn) to a plurality of peripheral devices with which the data communication interface device is communicating.

Figure 2:
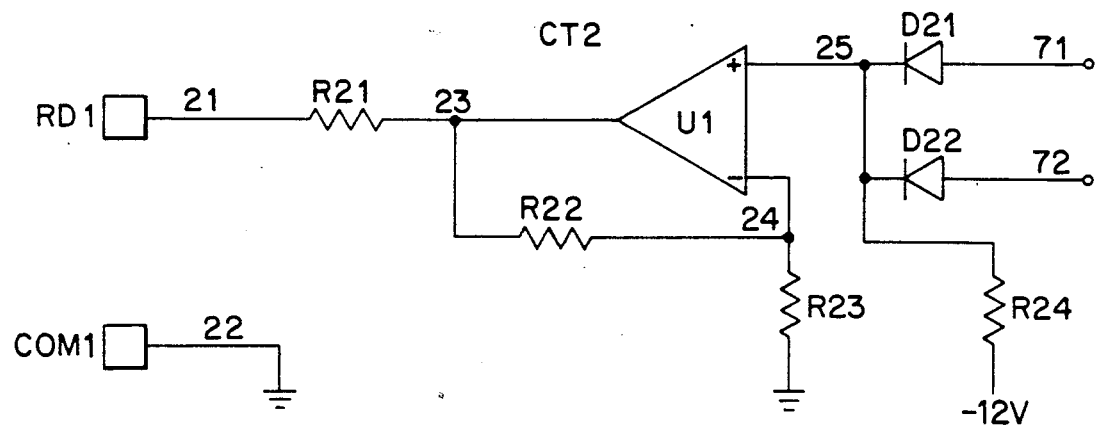
FIG. 2 is a circuit diagram of a preferred embodiment of the monitoring circuit of the present invention.

Referring to FIG. 2, the monitoring circuit CT2 comprises an operational amplifier (op-amp) U1 connected in a noninverting mode. I/O connector contact RD1 is connected via node 21 through resistor R21 (typical value 1 kilo-ohm) to node 23 to the output of op-amp U1. Node 23 connects through resistor R22 (typical value 100 kilo-ohms) to node 24 at the inverting input of op-amp U1. Node 24 connects through resistor R23 (typical value 10 kilo-ohms) to common ground. The noninverting input of op-amp U1 connects to node 25. Node 25 connects through resistor R24 (typical value 33 kilo-ohms) to −12 volt supply. Node 25 also connects diode D21 and D22 in parallel. Diode D21 and D22 are biased such that the anode of D21 is connected to node 71 and its cathode to node 25; and the anode of D22 is connected to node 72 and its cathode to node 25.

In operation, monitoring circuit CT2 is used to permit monitoring of the second voltage swing controlled output signal on node 71 outgoing to the remote channel port circuit and corresponding to the first external signal source output signal originating from I/O connector contact TD2, or of the first echo suppressed input signal on node 72 corresponding to the first amplified signal transmitted to I/O connector contact RD2. Based on resistor-diode-logic (RDL) principles, the diodes D21 and D22 in combination with resistor R24 form a logical OR-gate allowing the parallel connection of the second voltage swing controlled output signal on node 71 with the first echo suppressed input signal on node 72 via node 25. The op-amp U1 in its noninverting mode amplifies the monitored signal to a usable level.

Figure 3:
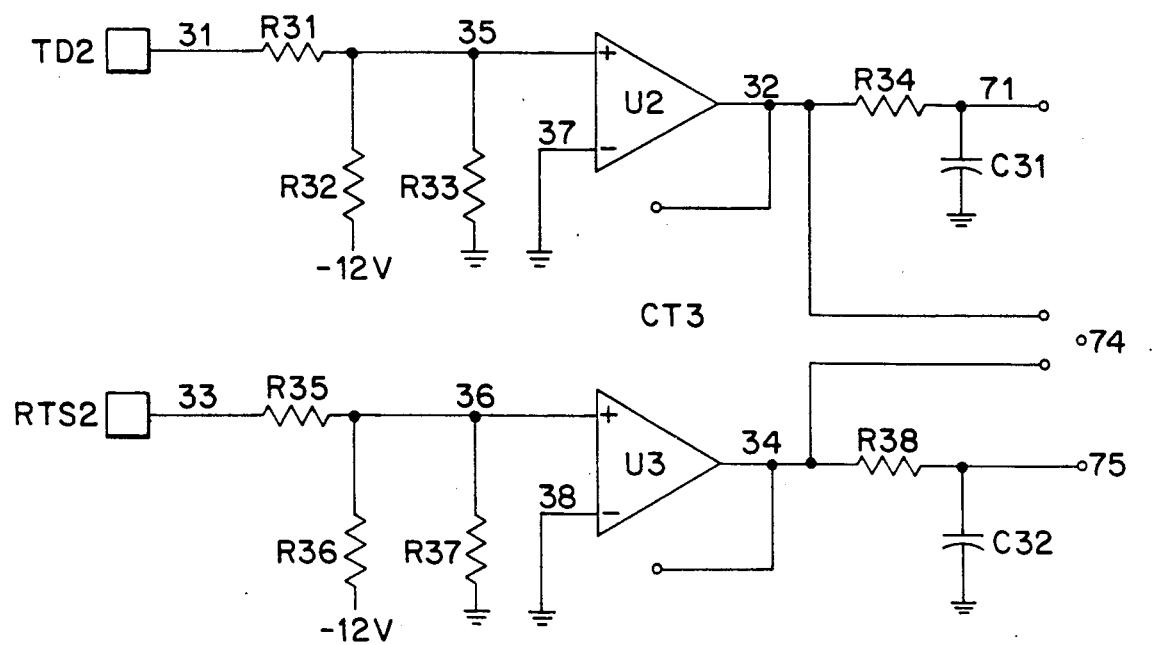
FIG. 3 is a circuit diagram of a preferred embodiment of the output signal voltage swing control circuit of the output signal invention.

Referring to FIG. 3, the output signal voltage swing control circuit CT3 comprises at least one op-amp connected in comparator mode. In the present embodiment, output signal voltage swing control circuit CT3 comprises two op-amps U2 and U3 connected in comparator mode. I/O connector contact TD2 is connected to node 31. Node 31 is connected through resistor R31 (typical value 1.1 kilo-ohms) to node 35. Node 35 is connected to the noninverting input of op-amp U2. Node 35 also connects through resistor R32 (typical value 330 kilo-ohms) to −12 volt supply, and through resistor R33 (typical value 5.1 kilo-ohms) to common ground. Node 37 connects the inverting input of op-amp U2 to common ground. The output of op-amp U2 is connected to node 32. Node 32 is connected through resistor R34 (typical value 1 kilo-ohm) to node 71. Node 71 is connected through the capacitor C31 (typical value 0.47 microfarads) to common ground. Node 32, as will be discussed later, is connected to contact 2 of IC2 in the LED display and timer circuit CT5. Node 32 also has an open jumper connection between it and node 74 as an option.

I/O connector contact RTS2 is connected to node 33 which is connected through resistor R35 (typical value 1.1 kilo-ohms) to node 36. Node 36 is connected to the positive input of op-amp U3. Node 36 is also connected through resistor R36 (typical value 330 kilo-ohms) to −12 volts supply, and through resistor R37 (typical value 5.1 kilo-ohms) to common ground. Node 38 connects the inverting input of op-amp U3 to common ground. The output of op-amp U3 connects to node 34 through resistor R38 (typical value 1 kilo-ohm) to node 75. Node 75 connects through capacitor C32 (typical value 0.47 microfarads) to common ground. Node 34 has an open jumper connection between it and node 74 as an option. Node 34 is connected to contact 7 of IC2 in the LED display and timer circuit CT5.

In operation, op-amps U2 and U3 are connected in comparator mode. First external signal source output signals from I/O connector contacts TD2 and RTS2 have limited voltage swings as determined by the resistor networks of R31, R32 and R33, and of R35, R36 and R37, respectively. The slew rates of the first voltage swing controlled output signals of the op-amps are controlled by at least one resistor-capacitor (RC) circuit each. In the present embodiment, the slew rates for the first voltage swing controlled output signals of op-amps U2 and U3 are controlled by R34 and C31 for the first voltage swing controlled output signal of op-amp U2, and R38 and C32 for the first voltage swing controlled output signal of op-amp U3. With their slew rates controlled, the first voltage swing controlled output signals become second voltage swing controlled output signals and are transmitted to the remote channel ports via nodes 71 and 75. Node 74 is optionally capable of being jumpered to either node 32 or node 34. Connection between node 32 and node 74 causes echo suppression during the presence of a first external signal source output signal on I/O connector contact RTS2 if available. If such a signal is not available, connection between nodes 74 and 34 will cause echo suppression on a data bit high condition. A data bit high condition exists whenever data is being transmitted by the first external signal source via I/O connector contact TD2.

Figure 4:
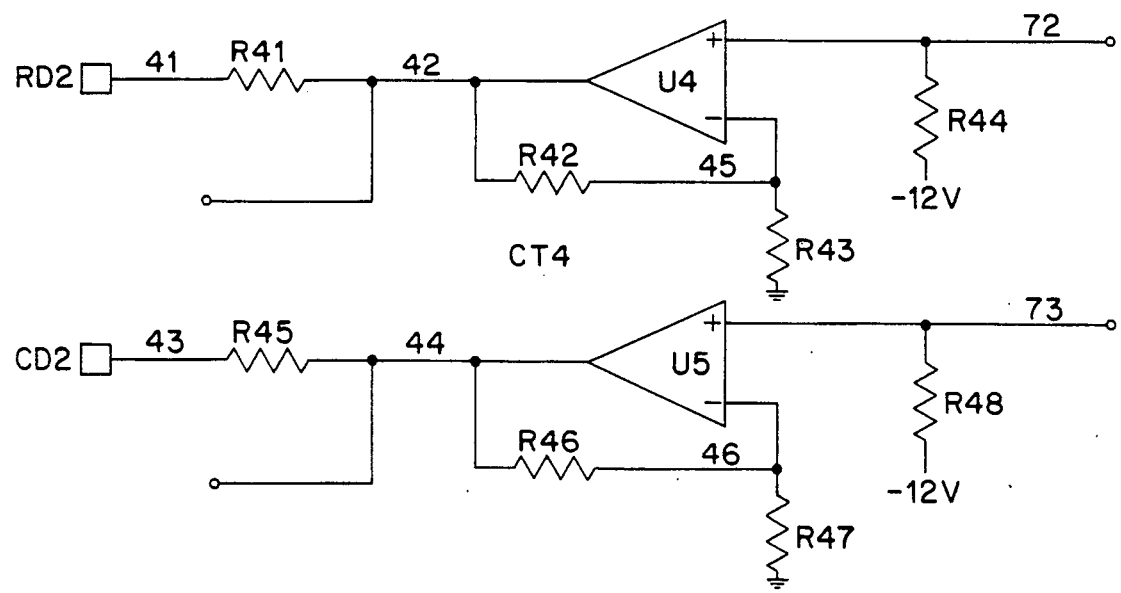
FIG. 4 is a circuit diagram of a preferred embodiment of the input signal amplifying circuit of the present invention.

Referring to FIG. 4, input signal amplifying circuit CT4 comprises at least one op-amp connected in noninverting mode. In the present embodiment, input signal amplifying circuit CT4 comprises two op-amps U4 and U5 connected in noninverting modes. I/O connector contact RD2 is connected to node 41. Node 41 is connected through resistor R41 (typical value 1 kilo-ohm) to node 42 to the output of op-amp U4. Node 42 is connected through resistor R42 (typical value 100 kilo-ohms) to node 45 to the inverting input of op-amp U4. Node 45 is connected through resistor R43 (typical value 10 kilo-ohms) to common ground. The noninverting input of op-amp U4 is connected to node 72 which connects through resistor R44 (typical value 10 kilo-ohms) to −12 volt supply. I/O connector contact CD2 is connected to node 43. Node 43 is connected through resistor R45 (typical value 1 kilo-ohm) to node 44 to the output of op-amp U5. Node 44 connects through resistor R46 (typical value 100 kilo-ohms) to node 46 to the inverting input of op-amp U5. Node 46 connects through resistor R47 (typical value 10 kilo-ohms) to common ground. The noninverting input of op-amp U5 is connected to node 73 which connects through resistor R48 (typical value 10 kilo-ohms) to −12 volt supply. Nodes 42 and 44 are connected to LED display and timer circuit CT5.

In operation, first echo suppressed input signals from the remote channel port circuit CT7 via nodes 72 and 73 are amplified by the input circuit CT4 and transmitted out as first amplified input signals to I/O connector contacts RD2 and CD2.

Figure 5:
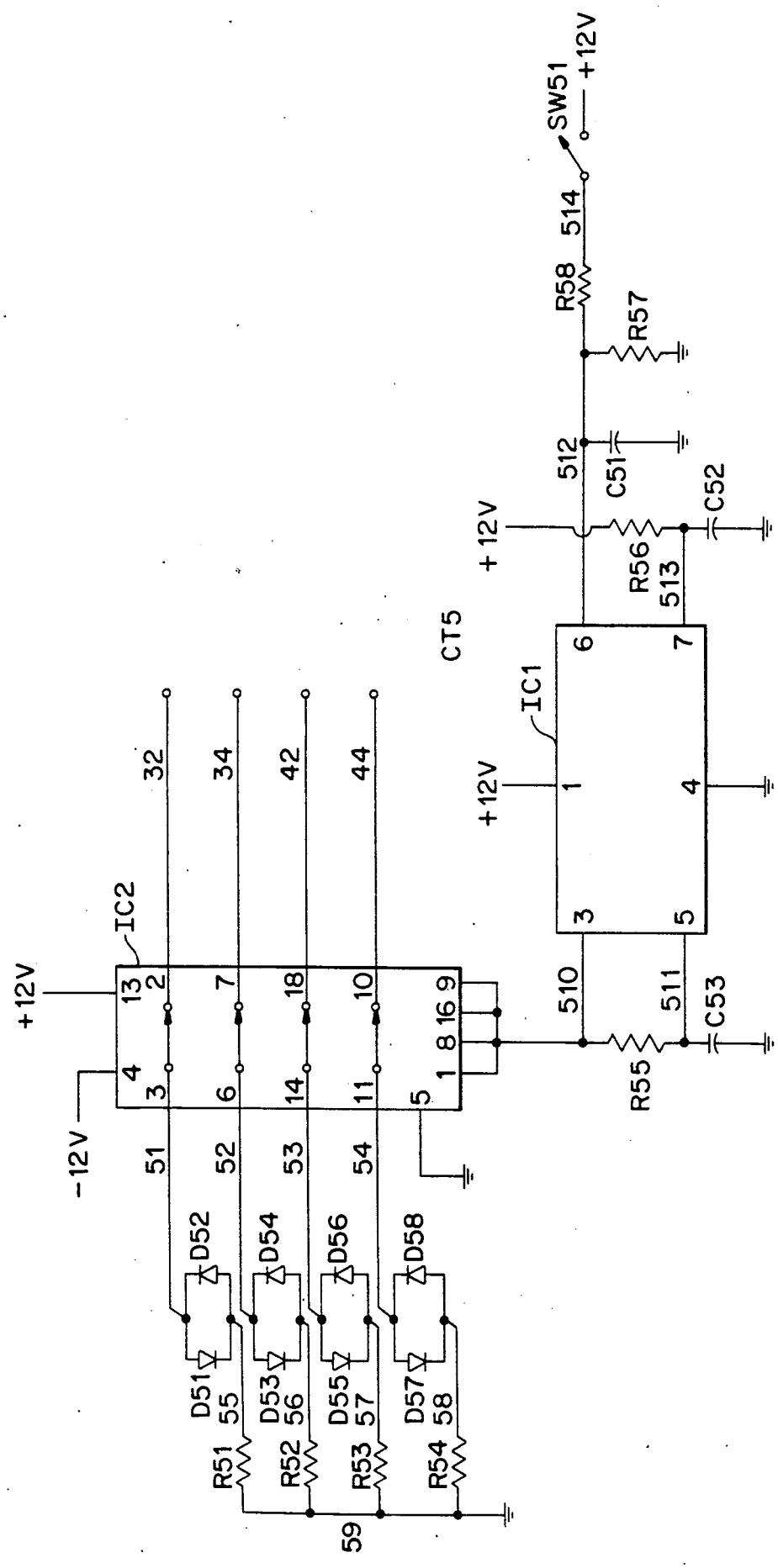
FIG. 5 is a circuit diagram of a preferred embodiment of the LED display and timer circuit of the present invention.

Referring to FIG. 5, the LED display and timer circuit CT5 monitors the first voltage swing controlled signals output of the op-amps in output circuit CT3 and the first amplified input signals of input circuit CT4. Node 32 and 34 are connected to contacts 2 and 7, respectively of analog switch IC2 (type MAX331). Nodes 42 and 44 are connected to contacts 18 and 10, respectively, of IC2. Contacts 3, 6, 14 and 11 of analog switch IC2 are connected to nodes 51, 52, 53 and 54, respectively. Nodes 51, 52, 53 and 54 are connected to the cathodes of light-emitting diodes D52, D54, D56 and D58 respectively. In parallel, nodes 51, 52, 53, and 54 are connected to the anodes of light-emitting diodes D51, D53, D55 and D57, respectively. The anodes of light-emitting diodes D52, D54, D56, and D58 are connected to nodes 55, 56, 57 and 58, respectively. The cathodes of light-emitting diodes D51, D53, D55 and D57 are connected to nodes 55, 56, 57 and 58, respectively. Nodes 55, 56, 57 and 58 are connected through resistors R51, R52, R53 and R54 (typical value 1 kilo-ohm) to node 59 to common ground.

Contacts 1, 8, 9 and 16 are connected in parallel to node 510 and to contact 3 of timer IC1 (type ICM7242). Node 510 is connected to resistor R55 (typical value 33 kilo-ohms) to node 511 to contact 5 of IC1. Node 51 is connected through capacitor C53 (typical value 100 microfarads) to common ground. Contact 6 of IC1 is connected to node 512 which connects through resistor R58 (typical value 1 kilo-ohm) to node 514, through momentary switch SW51 and to +12 volt supply. Node 512 is also connected through capacitor C51 (typical value 0.1 microfarads) and resistor R57 (typical value 100 kilo-ohms) in parallel to common ground. Contact 7 of IC1 is connected to node 513 which connects through resistor R56 (typical value 33 mega-ohms) to +12 volt supply, and through capacitor C52 (typical value 10 microfarads, 38 volts) to common ground.

In operation, analog switch circuit IC2 drives the light-emitting diode pairs according to the presence of corresponding signals tied to the light-emitting diode pairs. Due to the opposing biasing of the light-emitting diodes in a pair, only one of the diodes in a pair is active depending on the voltage swing of the signal tied to the light-emitting diode pair.

The timer circuit comprising timer IC1 activates the analog switch circuit IC2 for a time duration based on the values of resistor R56 and capacitor C52. The timer circuit then deactivates the analog switch circuit to conserve power.

In an alternative configuration, when sufficient power is available from the +12 volt supply to drive the light-emitting diodes, timer circuit IC2 can be disabled by removing it and analog switch circuit IC2.

Nodes 32, 34, 42 and 44 are then jumpered to nodes 51, 52, 53 and 54 respectively.

Figure 6:
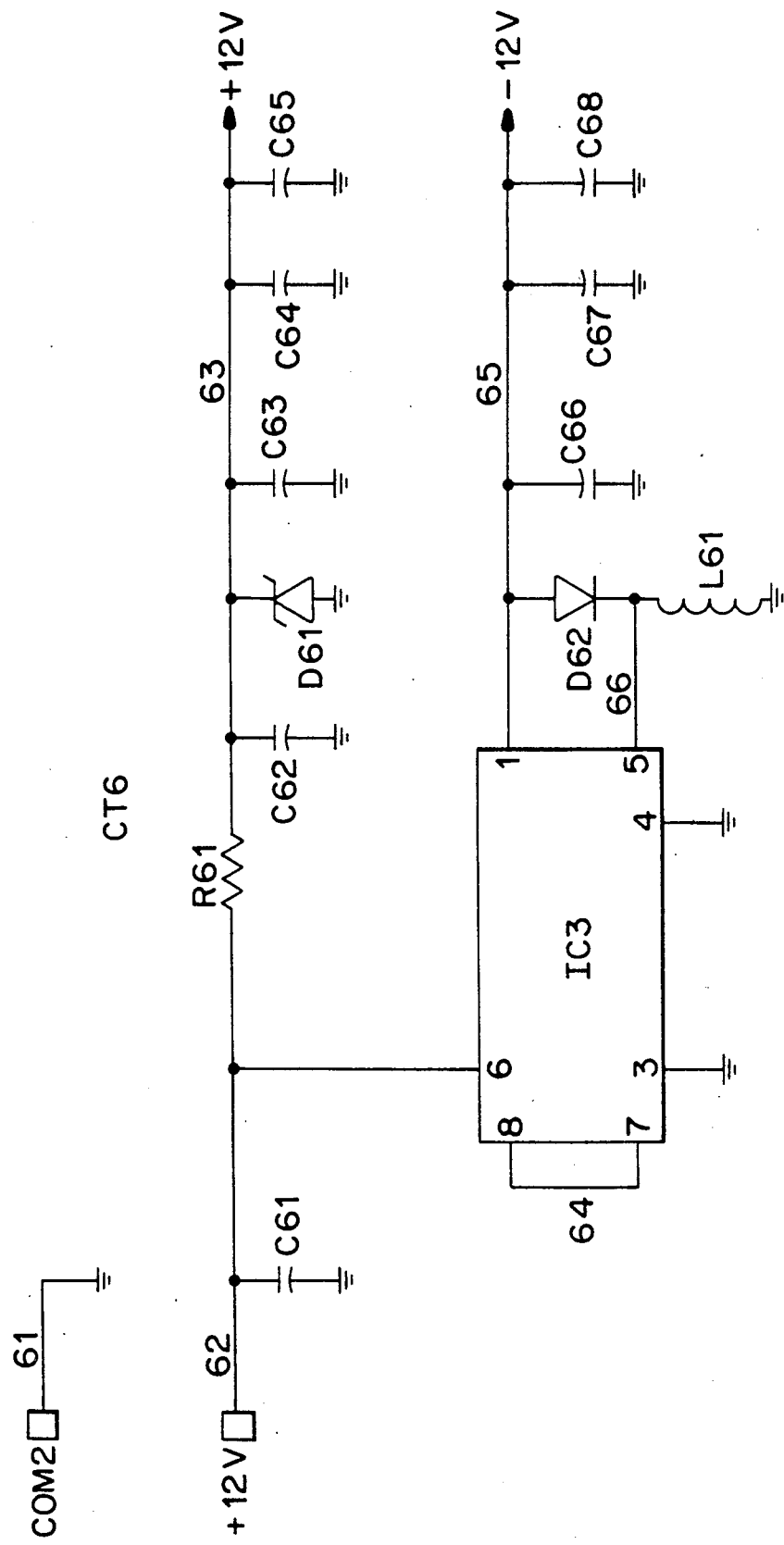
FIG. 6 is a circuit diagram of a preferred embodiment of the DC converter circuit of the present invention.

Referring to FIG. 6, DC converter circuit CT6 comprises DC converter IC3 (type MAX636) wherein the I/O connector contact +12 volt input is connected to node 62 and to contact 6 of IC3. Node 62 connects through capacitor C61 (typical value 100 microfarads) to common ground, and through resistor R61 (typical value 56 ohms 1 watt) to node 63 to +12 volt supply. Zener diode D61 (typical value 15 volts), capacitors C62, C63, C64 and C65 are connected in parallel between node 63 and common ground (typical value for C62 is 100 microfarads and 0.1 microfarads for capacitors C63-65). Zener diode D61 is biased such that its cathode is connected to node 63 and its anode to common ground. Contact 1 of IC3 is connected to node 65 as −12 volt supply. Node 65 is connected through diode D62 to node 66 and Contact 5 of IC3. Diode D62 is biased such that its anode is connected to Node 65 and its cathode to node 66. Node 66 is connected through inductor L61 (typical value 300 microhenries) to common ground. Capacitors C66, C67 and C68 (typical value for C66 is 100 microfarads, and 0.1 microfarads for C67 and C68) are connected in parallel between node 65 and common ground. I/O connector contact COM2 is connected to node 61 to common ground.

In operation, DC converter CT6 provides the −12 volt supply for the circuit CT1. In an alternative configuration, the −12 volt supply can be provided externally from the circuit by removing IC3.

Figure 7:
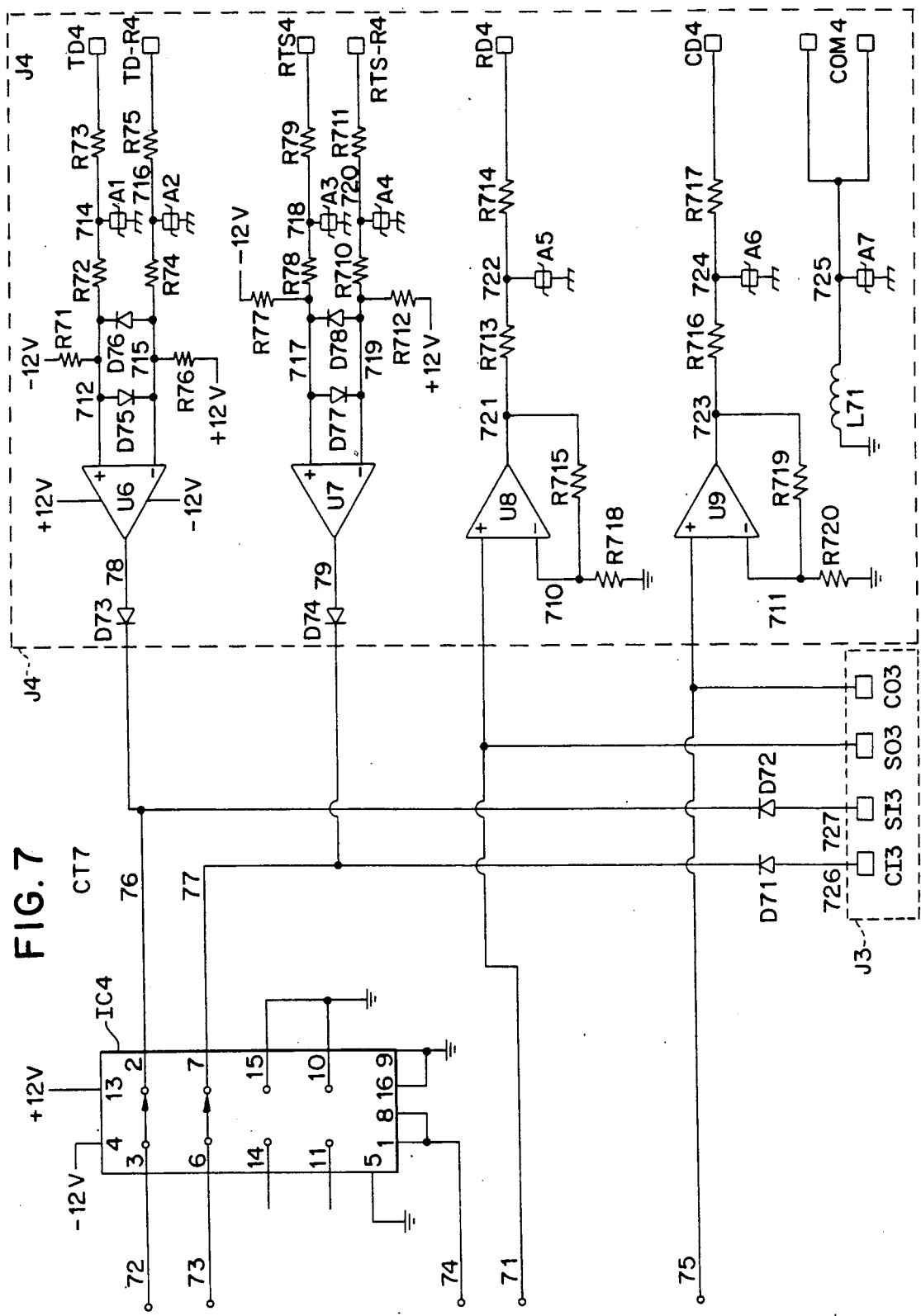
FIG. 7 is a circuit diagram of a preferred embodiment of an echo suppression circuit and one of a plurality of remote channel ports of the present invention.

Referring to FIG. 7, the remote channel port circuit CT7 comprises at least one remote channel port connected in parallel, to analog switch circuit IC4 (type MAX331) and to expansion port connector J3. Nodes 71 through 75 are connected to the other circuits such that nodes 71 is connected to monitor circuit CT2 and output signal voltage swing control circuit CT3; node 72 is connected to monitor circuit CT2 and input signal amplifying circuit CT4; node 73 is connected to input signal amplifying circuit CT4; and nodes 74 and 75 are connected to output signal voltage swing control circuit CT3.

Nodes 72 and 73 are connected to contacts 3 and 6 respectively, of analog switch circuit IC4. Node 74 is connected to contacts 1 and 8 of IC4. Contacts 9, 10, 15 and 16 of IC4 are connected to common ground.

Node 71 is connected to the noninverting input of op-amp U8 in the remote channel port and to the I/O connector contact SO3 in expansion port connector J3. Node 75 is connected to the noninverting input of op-amp U9 in the remote channel port and to the I/O connector contact CO3 of expansion port connector J3. Contact 2 of IC4 is connected to node 76 which connects to the cathode of diode D73 in the remote channel port and to the cathode of diode D72. Contact 7 of IC4 is connected to node 77 which connects to the cathode of diode D74 in the remote channel port and to the cathode of diode D71. The anode of diode D71 is connected to node 726 which connects to the I/O connector contact CI3 of expansion port connector J3. The anode of diode D72 is connected to node 727 which connects to the I/O connector contact SI3 of the expansion port connector J3.

In this configuration of the preferred embodiment, use of analog switch circuit IC4 achieves echo suppression and places the entire data communication interface circuit CT1 in a half duplex mode. Use of analog switch circuit IC4 disables the transmission of first echo suppressed input signals originating from any remote channel port circuit when the first external signal source is transmitting data to the remote channel port circuits. In an alternative configuration, the analog switch circuit IC4 can be removed and replaced with jumpers between nodes 72 and 76 and between 73 and 77.

Each remote channel port, as represented by remote channel port J4, comprises at least one op-amp connected in differential mode and/or at least one op-amp connected in noninverting mode. In the present embodiment, remote channel port J4 comprises four op-amps two of which are connected in differential mode (U6 and U7) and the remaining two in noninverting mode (U8 and U9).

The noninverting input of op-amp U6 is connected to node 712 which connects through resistor R72 (typical value 1.3 kilo-ohms) to node 714 which connects through resistor R73 (typical value 100 ohms, 2 watts) to I/O connector contact TD4. Node 712 is connected through resistor R71 (typical value 33 kilo-ohms) to −12 volt supply. The inverting input of op-amp U6 is connected to node 715 which connects through resistor R74 (typical value 1.3 kilo-ohms) to node 716 which connects through resistor R75 (typical value 100 ohms, 2 watts) to I/O connector contact TD-R4. Node 715 connects through resistor R76 (typical value 33 kilo-ohms) to +12 volt supply. The anode of diode D75 and the cathode of diode D76 are connected to node 712 while the cathode of diode D75 and the anode of D76 are connected to node 715. Nodes 714 and 716 are connected through metal oxide varistors (MOVs) A1 and A2, respectively, to earth ground. The output of op-amp U6 is connected to node 78 which connects to the anode of diode D73.

The noninverting input of op-amp U7 is connected to node 717 which connects through resistor R78 (typical value 1.3 kilo-ohms) to nodes 718 which connects through resistor R79 (typical value 100 ohms, 2 watts) to I/O connector contact RTS4. Node 17 is connected through resistor R77 (typical value 33 kilo-ohms) to −12 volt supply.

The inverting input of op-amp U7 is connected to node 719 which connects through resistor R710 (typical value 1.3 kilo-ohms) to node 720 which connects through the resistor R711 (typical value 100 ohms, 2 watts) to I/O connector contact RTS-R4. Node 719 is connected to resistor R712 (typical value 33 kilo-ohms) to +12 volt supply. Nodes 718 and 720 are connected through MOVs A3 and A4, respectively, to earth ground. The anode of diode D77 and the cathode of diode D78 are connected to node 717; the cathode of diode D77 and the anode of diode D78 are connected to node 719. The output of op-amp U7 is connected to node 79 which connects to the anode of diode D74.

The inverting input of op-amp U8 is connected to node 710 which connects through resistor R718 (typical value 10 kilo-ohms) to common ground. Node 710 also connects through resistor R715 (typical value 100 kilo-ohms) to node 721 which connects to the output of op-amp U8 and through resistor R713 (typical value 1 kilo-ohm) to node 722. Node 722 is connected through MOV A5 to earth ground and through resistor R714 (typical value 100 ohms, 2 watts) to I/O connector contact RD4.

The inverting input of op-amp U9 is connected to node 711 which is connected through the resistor R720 (typical value 10 kilo-ohms) to common ground. Node 711 also connects through resistor R719 (typical value 100 kilo ohms) to node 723 which connects to the output of op-amp U9 and through resistor R716 (typical value 1 kilo-ohm) to node 724. Node 724 is connected through MOV A6 to earth ground and through resistor R717 (typical value 100 ohms, 2 watts) to I/O connector contact CD4.

I/O connector contacts COM4 are connected to node 725 which is connected through inductor L71 (typical value 100 microhenries) to common ground. Node 725 also connects through MOV A7 to earth ground.

In operation, communication to the individual remotely located peripheral devices occurs through the remote channel ports. First and second external input signals pass through the differential mode amplifiers in order to amplify the signal to usable levels as a first remote channel input signal. Noise coupled in the long wires from the remotely located peripheral device is eliminated by the common mode rejection of the op-amp. The op-amps for the first and second external input signal are in differential mode in order to give the remote device the appearance of a pseudo-current loop and thereby a load similar to conventional RS-232 communication. Bias resistors R71, R76, R77, and R712 are provided to keep these input nodes to the op-amps at marking levels when no remote device is connected to a specific remote channel port. MOVs A1 to A7 provide electrical surge protection for the device.

Based on RDL principles, resistor R44 from FIG. 4 in combination with diodes D73, D72 and any other diode from other remote channel port circuits connected in parallel to node 76 forms a multi-input logical OR-gate allowing the parallel connection of a plurality of first remote channel input signals via node 76. Similarly, resistor R48 from FIG. 4 in combination with diodes D74, DD71 and any other diode from other remote channel port circuits connected in parallel to node 77 forms a multi-input logical OR-gate allowing the parallel connection of a plurality of first remote channel input signals via node 77.

Second voltage swing controlled output signals from the output signal voltage swing control circuit CT3 via nodes 71 and 75 are amplified by the circuits comprising op-amps U8 and U9, respectively, and transmitted as third voltage swing controlled output signals to the remote devices via the I/O connector contacts RD4 and CD4, respectively.

Expansion port J3 allows additional remote channel port circuits and/or data communication interface devices to be connected to the initial circuit.

Figure 8:
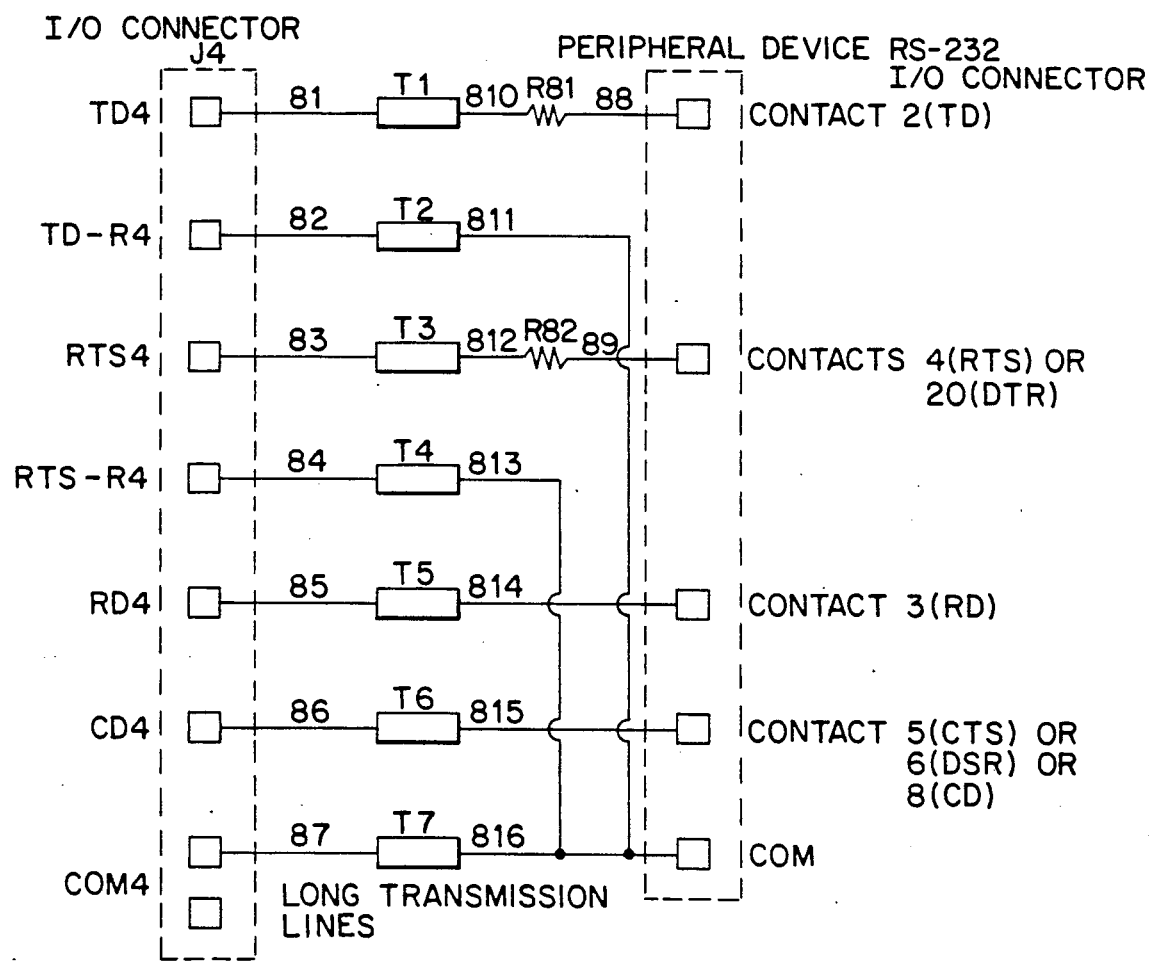
FIG. 8 is a circuit diagram of a preferred embodiment of the electrical connections between the input/output connector contacts of the present invention and the input/output connector contacts of a typical peripheral device having an RS-232C standard input/output connector.

Referring to FIG. 8, I/O connector J4 comprises I/O connector contacts TD4, TD-R4, RTS4, RTS-R4, RD4, CD4 and COM4. The I/O connector of a typical second external signal source and receiver comprises I/O connector contacts TD, RTS, DTR, RD, CD, CTS, DSR and COM. Under typical RS-232C configuration, the standard physical contact layout is as follows: I/O connector contact TD is contact 2, RTS is contact 4, DTR is contact 20, RD is contact 3, CD is contact 8, CTS is contact 5, DSR is contact 6 and COM is contact 7.

Transmission lines T1 through T7 are representative of the total electrical characteristics (i.e., resistive, capacitive, inductive) of each transmission line that are typically found in long transmission lines. Since these electrical characteristics can have an effect on signals passing through the transmission lines, the transmission lines are represented as distinct components with nodes on either side of them. The specific electrical characteristics of the transmission lines are dependent upon several factors including the length of the line, the types of signals being transmitted and the existence of external electrical/electromagnetic noise.

In connecting I/O connector J4 to a second external signal source and receiver, I/O connector contact TD4 connects via node 81 through transmission line T1 to node 810. Node 810 connects through resistor R81 to node 88. Node 88 connects to contact 2 (TD). Contact TD-R4 connects via node 82 through transmission line T2 to node 811. Node 811 connects to contact 7 (COM). Contact RTS4 connects via node 83 through transmission line T3 to node 812. Node 812 connects through resistor R82 to node 89. Node 89 connects to contact 4 (RTS) or to contact 20 (DTR). Contact RTS-R4 connects via node 84 through transmission line T4 to node 813. Node 813 connects to contact 7 (COM). Contact RD4 connects via node 85 through transmission line T5 to node 814. Node 814 connects to contact 3 (RD). Contact CD4 connects via node 86 through transmission line T6 to node 815. Node 815 connects to either contact 5 (CTS), contact 6 (DSR) or contact 8 (CD). Contacts COM4 connect via node 87 through transmission line T7 to node 816. Node 816 connects to contact 7 (COM). Transmission line T1 with T2, and transmission line T3 with T4 are configured to form two twisted pairs of transmission lines.

In operation, the connections of contact RTS4 with contact 4 (RTS) or contact 20 (DTR), and of contact CD4 with contact 5 (CTS), contact 6 (DSR) or contact 8 (CD) depend on the requirements of the particular application or of the second external signal source and receiver. Resistors R81 and R82 provide source matching for the impedances of the transmission lines to which they are connected. Their values are dependent upon the electrical characteristics of the transmission lines, and potentially can be as low as 0 ohms. The twisted pair configurations of transmission line T1 with T2 and of T3 with T4 helps protect the transmitted signals from external noise.

The present invention embodies a new and unique interface which allows the use of RS-232C communication without being hampered by some of the practical limitations normally associated with conventional coupled RS-232 communication. Such an interface allows multiple remote polling between a computer or a processor device and a plurality of remotely located peripheral devices, longer distances between the computer and the peripheral devices, and more efficient power consumption requirements for driving the receiving remotely located peripheral device. One of the realizable advantages to such an interface is greater efficiency and capacity in a system capable of monitoring a large number of remotely located devices or sensors. Another advantage is costs savings resulting from fewer computers or processors controlling a given number of devices or sensors, and from the more efficient driving power consumption in driving the peripheral devices and sensors.

While the present invention has been described and disclosed in the preceding preferred embodiment, it will be obvious to anyone skilled in the art that the invention may also find application with other data communication systems using configurations other than RS-232C. It will also be obvious to those skilled in the art that changes in form and detail (i.e., types and quantities of op-amps, timers, DC converters, analog switches, diodes and MOVs; values for resistors, capacitors, and inductors) does not depart from the spirit and scope of the invention. The preferred embodiment detailed herein is merely illustrative and not restrictive of the scope of the invention indicated by the following claims.

I claim:

1. A Data Communication Interface Device for extended range communication between a first external signal source and receiver, and a second external signal source and receiver, said device comprising:

input signal processing means comprising a differential mode operational amplifier for processing at least one input signal from said second external signal source wherein said input signal processing means electrically connects said second external signal source to said first external signal receiver;

means including a common ground terminal in said second external signal source and receiver, said common ground terminal being connected to one input of said differential mode amplifier for giving the appearance of a pseudo-current loop between said input signal processing means and said second external signal source and receiver;

a remote channel port;

output signal processing means for providing extended range communications between the first external signal source and the second external signal receiver, said output signal processing means including means for controlling voltage swings of at least one output signal from said first external signal source such that the output signal voltage swing control means electrically connects the first external signal source to the remote channel port, wherein said voltage swing control means includes at least one operational amplifier electrically connected to receive said first external signal source output signal and to transmit a first voltage swing controlled output signal; and at least one slew rate control circuit electrically connected to receive said first voltage swing controlled output signal from said first external signal source output signal receiving operational amplifier and to transmit a second voltage swing controlled output signal to said remote channel port.

2. A Data Communication Interface Device, in accordance with claim 1, which includes:

at least one electrical connection providing means for electrically connecting said remote channel port to said at least one operational amplifier electrically connected to receive said first external signal source output signal.

3. A Data Communication Interface Device, in accordance with claim 2, wherein said electrical connection means comprises electrical jumpers connected between said remote channel port and said at least one operational amplifier electrically connected to receive said first external source output signal.

4. A Data Communication Interface Device, in accordance with claim 2, wherein said electrical connection means comprises signal echo suppression means.

5. A Data Communication Interface Device, in accordance with claim 4, wherein said signal echo suppression means comprises:

at least one analog switch circuit means having at least one analog switch electrically connected to receive a first remote channel input signal and to transmit a first echo suppressed input signal to said first external signal source receiving operational amplifier, said operational amplifier being electrically connected to receive said first echo suppressed input signal and to transmit said first amplified input signal to said first external signal receiver; and at least one disable control circuit means for each analog switch electrically connected to receive said first voltage swing controlled output signal, wherein said disable control circuit means disables said analog switch from transmitting said first echo suppressed input signal when said first voltage swing controlled output signal is being transmitted.

6. A Data Communication Interface Device, in accordance with claim 1, wherein said remote channel port comprises:

at least one operational amplifier electrically connected to receive each said second voltage swing controlled output signal and to transmit a third voltage swing controlled output signal to said second external signal receiver.

7. A Data Communication Interface Device, in accordance with claim 6, wherein said third voltage swing controlled output operational amplifier is electrically configured in noninverting amplifier mode.

8. A Data Communication Interface Device, in accordance with claim 1, wherein said output signal voltage swing control means comprises:

two external signal source output signal receiving operational amplifiers; and two slew rate control circuits, wherein:

a first of said two external signal source output signal receiving operational amplifiers is electrically connected to receive a first of two external signal source output signals and to transmit said first of two voltage swing controlled output signals;

a first of said two slew rate control circuits is electrically connected to receive said first of two voltage swing controlled output signals and to transmit a first of two slew rate controlled output signals;

a second of said two external signal source output signal receiving operational amplifiers is electrically connected to receive a second of said two external signal source output signals and to transmit a second of said two voltage swing controlled output signals; and a second of said two slew rate control circuits is electrically connected to receive said second of two voltage swing controlled output signals and to transmit a second of said two slew rate controlled output signals.

9. A Data Communication Interface Device, in accordance with claim 8 further comprising means for alternately connecting said first of said two external signal source output signal receiving operational amplifiers to transmit said first of two voltage swing controlled output signals to a disable control circuit of said signal echo suppression means and said second of two external signal source output signal receiving operational amplifiers to transmit said second of two voltage swing controlled output signals to said disable control circuit of said signal echo suppression means.

10. A Data Communication Interface Device, in accordance with claim 1, wherein said first external signal source output signal receiving operational amplifier is electrically configured in comparator mode.

11. A Data Communication Interface Device for extended range RS-232 communication between a first external signal source and receiver located within 25 feet of said interface, and at least one remote second external signal source and receiver, comprising:

means for receiving a first electrical signal having an RS-232 format from said first external signal source, said receiving means including means for amplifying and modifying said first electrical signal, and for transmitting said modified signal over a distance of up to at least 5,000 feet to said remote second external receiver; and means for receiving a second electrical signal having an RS-232 format over a distance of up to at least 5,000 feet from said remote second external source, including means for amplifying and transmitting said second electrical signal to said first external receiver, and for preserving the requirements of said RS-232 format from the perspective of the remote second external source, said means for receiving a second electrical signal including common mode rejection means for providing noise immunity by including a DC return for said second electrical signal, said DC return completing a loop circuit which includes an operational amplifier arranged to operate in differential mode, a resistor/diode network arranged to provide impedance matching, and a common ground terminal in said remote second external source connected to an input of said operational amplifier.

12. A Data Communication Interface Device as claimed in claim 11, wherein said means for receiving a first electrical signal comprises an amplifier connected to receive said signal from said first external source; and an RC network coupled with a high gain amplifier for modifying and transmitting said modified signal to the remote second external receiver.

13. A data communication interface device as claimed in claim 12, wherein said RC network is arranged to convert the rising and falling edges of a digital signal wave form into pulses having ramp-shaped rising and falling edges complying with RS-232 rise-time specifications.

14. A data communication interface device as claimed in claim 11, further comprising a second means for receiving an RS-232 signal from said second remote external signal source to form multiple remote ports, and a diode network arranged to form an OR gate in order to combine input signals for transmission to said remote ports.

15. A data communication interface device as claimed in claim 14, further comprising an analog switch arranged to disable signals from at least one of said remote ports during active signaling from the first external signal source, thereby preventing any coupling between simultaneous input and output signal, and controlled by a signal from said first external source.

* * * * *